June 2, 1959  P. SOULARY ET AL  2,889,480
DEVICE FOR ASSISTING THE IGNITION OF A WELDING
ARC AND STABILIZING THE SAME
Filed July 28, 1954  3 Sheets-Sheet 1

INVENTORS
Pierre Soulary
Jacques Moignet
BY Stone, Boyden & Mack
ATTORNEYS.

June 2, 1959  P. SOULARY ET AL  2,889,480
DEVICE FOR ASSISTING THE IGNITION OF A WELDING
ARC AND STABILIZING THE SAME
Filed July 28, 1954  3 Sheets-Sheet 3

| ATMOSPHERE | | ELECTRODES |
|---|---|---|
| A | Air | Tungsten |
| B | Air | Aluminum |
| C | Argon | Tungsten |
| D | Argon | Aluminum |

INVENTORS
Pierre Soulary
Jacques Moiquet
BY Stone, Boyden + Mack
ATTORNEYS.

United States Patent Office 2,889,480
Patented June 2, 1959

2,889,480

DEVICE FOR ASSISTING THE IGNITION OF A WELDING ARC AND STABILIZING THE SAME

Pierre Soulary, Paris, and Jacques Moignet, La Frette, France, assignors to L'Air Liquide, Societe Anonyme pour l'Etude et l'Exploitation des Procedes Georges Claude, Paris, France Application July 28, 1954, Serial No. 446,204

Claims priority, application France July 30, 1953

8 Claims. (Cl. 313—111)

The present invention relates to devices for assisting the ignition of a welding arc and for stabilizing said arc by applying recurrent voltage surges in the arc circuit.

It is more particularly concerned with inert gas shielded arc welding of light metals, such as aluminum and its alloys, using alternating current and argon or helium as shielding gas. It is known that, in this kind of welding, it is difficult to re-ignite the arc at the beginning of the half-wave during which the welding electrode becomes positive. One solution is known, which consists in superimposing to the welding current high-frequency oscillatory surges having a high voltage, for instance upwards of 1,500 volts. Owing to this voltage, interferences with radio communications are a serious problem. There is also a risk of disruptive discharges, possibly followed by arcing, taking place across the insulation of the welding apparatus.

Another known solution consists in applying to the welding circuit recurrent discharges from a capacitor controlled by a thyratron which is itself triggered by the arc voltage. However, devices of this type are comparatively fragile and costly.

The present invention, applicable to various arc welding systems which comprise, generally, a capacitor, a source of electric current for charging said capacitor, and a spark gap, consists in confining said spark gap in a gaseous medium having a dielectric strength less than that of air, and adjusting said spark gap for a sparkover voltage substantially less than 1,500 volts D.C. This sparkover voltage should preferably be comprised between 250 and 800 volts D.C., the preferred range being from about 300 to 450 volts D.C.

Monoatomic gases and hydrogen have been found suitable, and may be used either at atmospheric pressure, or at sub-atmospheric pressures, one important requirement being that the de-ionizing time be short enough, substantially shorter than 0.01 second.

According to one embodiment of the invention, the spark gap electrodes are enclosed within a shell in which an inert gas is circulated. The circulation of the gas is useful for cooling the active ends of the spark gap electrodes. A preferred embodiment of the invention is one in which the welding equipment is of the inert-gas shielded arc type, a portion at least of the stream of inert welding gas being circulated inside the shell enclosing the spark gap electrodes. It is advantageous to direct the gas stream so as to make it sweep the active ends of the spark gap electrodes, to obtain a complete cooling effect. Also, according to the invention, the spark gap electrodes should preferably be made of aluminum, which has the advantage of having a work function appreciably less than those of tungsten or copper, for instance, and has also the unexpected advantage of being much less liable to give rise to the formation of an arc, instead of sparks, between the electrodes. When aluminum electrodes are properly cooled by a stream of inert gas, such as argon or helium, their useful lifetime is quite satisfactory. A proper cooling may be obtained by providing one of the two electrodes with a longitudinal bore which opens at the active end of this electrode, opposite the other electrode.

According to a further embodiment of the invention, flow-responsive means are provided for interrupting the formation of sparks whenever the gas flow through the device is less than a predetermined value. These means may for instance be operative for retracting one electrode beyond disruptive distance from the other electrode, whenever the gas flow is less than the predetermined value.

In practice, this device may consist of a rigid shell divided by a flexible diaphragm, with a constricted gas-passage from one side to the other side of this diaphragm, one electrode being attached in the center of the diaphragm and the other electrode being adjustably supported in said rigid shell. This device is advantageously built as a replaceable plug-in unit, provided with two nipples for inserting it in a flexible gas hose.

This spark gap device is applicable to a conventional high-frequency stabilizing circuit, with the advantage that a much lower voltage may be used. This is, for a large extent, due to the fact that the inert gas atmosphere makes it possible, for a given disruptive voltage, to increase the distance between the electrode tips. The choice of aluminum also allows a further increase of this distance, and this avoids the difficulty of adjusting a very narrow gap, which might also become short-circuited in case of the surface of the electrodes becoming even slightly altered by the effect of the sparks.

The spark gap device of the present invention also lends itself advantageously to the realization of new stabilizing circuits for welding arcs which have the advantage of minimizing the production of radiations capable of interfering with radio communications.

These circuits comprise a capacitor, a source of current for charging said capacitor, and a spark gap of the new type described hereinabove. Their novel feature is that their elements are calculated so as to produce recurrent voltage surges of relatively low frequency, this frequency being for instance comprised within the range of audible frequency. The minimum should be at least the frequency of the mains supplying the welding system, for producing at least one voltage surge at the beginning of each half-cycle during which the welding electrode becomes positive.

A first embodiment of such a circuit is one in which the source of current for charging the capacitor is a step-up transformer having its primary winding connected to the mains and its secondary winding connected to the plates of the capacitor through an appropriate resistor, for instance approximately 1,000 ohms, the capacitor having for instance a capacity of 1 microfarad. The spark gap is connected between one plate of this capacitor and one of the welding electrodes, either the rod or the work. The spark gap may have a spark-over voltage comprised between 200 and 800 volts D.C., and the secondary of the step-up transformer should preferably have an open-circuit voltage higher than approximately 1.2 times the sparkover voltage of the spark gap.

A second embodiment of a stabilizer circuit according to the present invention has a direct current source for charging the capacitor. The negative terminal of this source is connected to one plate of the capacitor through a resistor, and a spark gap is inserted in series between said plate and the welding rod. The D.C. source should have an open-circuit voltage slightly smaller than the sparkover voltage of the spark gap, so that sparking over will take place only when the arc voltage rises at the beginning of each half-cycle during which the welding rod becomes positive. This open-arc voltage adds itself to the condenser voltage, thereby causing the condenser to discharge itself across the spark gap and between the welding electrodes.

A third embodiment of a stabilizing circuit according to the invention is a circuit adapted for applying a recurrent series of voltage surges in the arc circuit at the beginning of each half-cycle. This circuit comprises a first capacitor, for instance of approximately 0.25 microfarad, a step-up transformer, the primary winding of which is parallel-connected with the secondary winding of the welding transformer, the secondary winding of said step-up transformer having for instance an open-circuit voltage of approximately 500 to 600 volts, and being connected to said first capacitor through a second capacitor of, for instance, 1 microfarad, and said first capacitor having one plate connected directly to one welding electrode and its other plate connected to the other welding electrode through a spark gap of the above-described type.

A fourth embodiment of a low-frequency stabilizing circuit according to the invention also comprises a first capacitor, a step-up transformer having its primary winding parallel-connected with the secondary winding of the welding transformer, while the secondary winding of this step-up transformer is parallel-connected to the said first capacitor, one plate of which is connected in series to one welding electrode through a second capacitor and through a spark gap of the above-described type.

This is the preferred embodiment of a stabilizing circuit according to the invention. Satisfactory values are for instance 0.1 microfarad for the first capacitor and 0.25 for the second capacitor. The open-circuit voltage of the step-up transformer may be for instance in the vicinity of 800 volts, while the spark gap may be adjusted for a sparkover voltage comprised between about 250 and 500 volts D.C. Oscillograms show that this type of circuit produces, at the beginning of each half-cycle, a series of about half a dozen surges. The number and position of these surges in the half-cycle considered may be adjusted within proper limits by adjusting the values of the capacitors, according to the characteristics of the step-up transformer. When the requirements for suppression of radio interference are particularly exacting, this circuit may be advantageously provided with a damping network, consisting for instance of a resistor of approximately 25 ohms in series between the welding electrode and the spark gap and a capacitor of approximately 10,000 picofarads between this welding electrode and the work-piece.

The present invention will now be further explained with reference to the accompanying drawing, in which:

Figure 1 is a circuit diagram of a conventional welding system embodying a high-frequency stabilizing device.

Figures 2 to 5, inclusive, are circuit diagrams of various welding systems embodying low-frequency stabilizing devices according to the invention.

Figure 1:
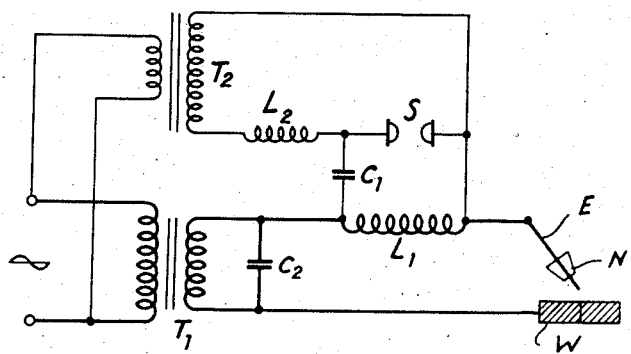

The circuit of Fig. 1 is a conventional high-frequency circuit, in which $T_1$ is the welding transformer, F the welding electrode, N the gas nozzle surrounding this electrode, W the work-piece, $T_2$ a step-up transformer for charging a capacitor $C_1$ through an air-core inductance $L_1$. A spark gap S is inserted in series with $L_1$ and $C_1$, while a choke coil $L_2$ is inserted between $C_1$ and the secondary winding of $T_2$, as a protection for the insulation of $T_2$. A second capacitor $C_2$ shunts the secondary winding of $T_1$, for by-passing the high-frequency oscillations, thereby protecting the insulation of $T_1$ and avoiding the transmission of these oscillations to the primary winding of $T_1$.

The novel feature in this circuit is the low operating voltage, the spark gap S being confined in an inert gas and being adjusted for a sparkover voltage less than 1,500 volts D.C. This spark gap may advantageously be of the type shown in Figures 6 or 7, and be connected to the system which supplies inert gas to the nozzle around the welding electrode.

Figure 2:
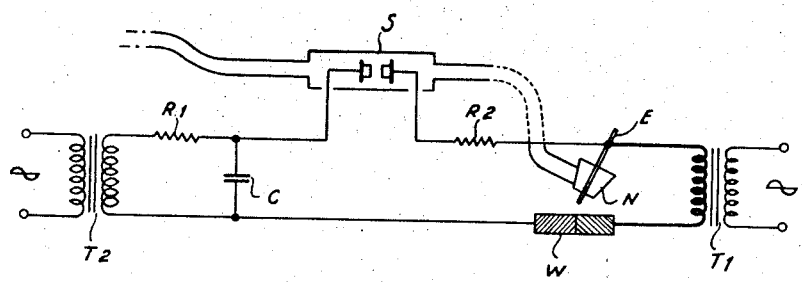

Figures 2 to 5 inclusive show 4 different low-frequency stabilizing circuits according to the invention. In each of these figures, $T_1$ is a welding transformer, the secondary of which may have a relatively low open-circuit voltage, for instance 50 or 60 volts. E is a welding rod, held in a welding gun G having a gas-nozzle N around the electrode tip, and S is a spark gap, enclosed in a shell containing an inert gas. Figure 2 shows diagramatically how this spark gap S may be inserted in the gas-supply line through which inert gas is fed to the welding gun. This supply line is shown partly in dotted line. In each of Figures 2 to 5, the welding rod E is connected to one terminal of the secondary winding of $T_1$, while the work-piece W is connected to the other terminal of this winding.

Taking now Figure 2, the stabilizing circuit comprises a step-up transformer $T_2$, the primary winding of which is connected to the mains and the secondary winding of which is connected to a capacitor C across a first resistance $R_1$. One plate of C is connected to one electrode of the spark gap S, the second electrode of S being connected to the welding electrode E across a second resistance $R_2$. Good results have been obtained with the following values: $C=1$ microfarad, $R_1=1,000$ ohms; the value of $R_2$ is not critical, the use of this resistance being to limit the intensity of the current surges. The open-circuit voltage of the secondary of $T_2$ may be for instance approximately 450 volts R.M.S., in which case the sparkover voltage of S may be adjusted at about 250 volts R.M.S. at the mains frequency (50 or 60 Hz.). The corresponding gap width is about from 0.05 to 0.07 millimeter, when using tungsten electrodes in a stream of argon at approximately atmospheric pressure.

Figure 3:
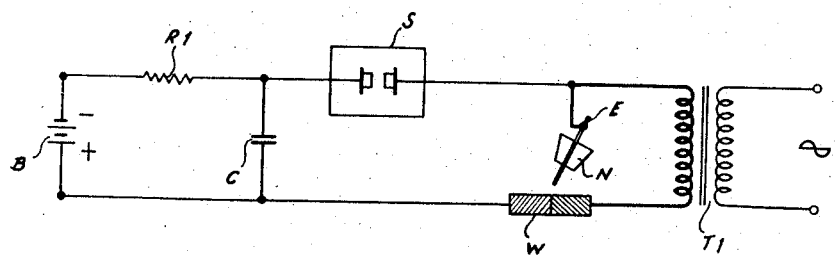

The circuit of Figure 3 is similar to the one shown in Figure 2, except that $T_2$ is replaced by a D.C. source, for instance a battery B, or preferably, a rectifier. This source charges the capacitor C across a resistor $R_1$. Good results have been obtained with a D.C. source of 370 volts, the value of $R_1$ being about 5,000 ohms, and C being about 1 microfarad. The negative terminal of B is connected to that plate of C which is connected to the welding electrode E, the plus terminal of B being connected to the work W. The sparkover voltage of S is about 280 volts R.M.S. at 50 cycles, which corresponds to about 400 volts D.C., so that S will spark only if the arc voltage is opposed to the charging voltage of C and is therefore additive thereto. This occurs when the welding rod E starts to become positive. Although the discharge of C between E and W takes place in the direction opposite to the arc current which is going to become established, the ignition and stabilization of the arc are satisfactory. It should be noted that the welding system of Figure 3 could never be operated in the low-voltage range indicated hereabove, using a spark gap of the conventional air type. The new spark gap is therefore an essential element of this circuit.

Figure 4:
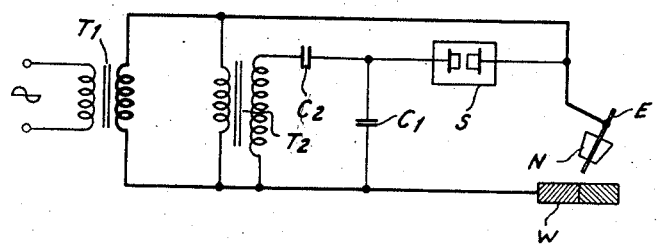

Figure 4 shows another embodiment of the same principle, in which a step-up transformer $T_2$ has its primary winding parallel-connected between the welding electrode E and the work W. Its secondary winding has one terminal connected to the work W and the other connected to a first capacitor $C_1$ across a second capacitor $C_2$. One plate of $C_1$ is connected to the work W and the other plate, connected to $T_2$ through $C_2$, is also connected to one electrode of S, the other electrode of S being connected to the welding rod E.

The operation of the device of Figure 4 is as follows: when the welding arc becomes extinguished at the end of one half-cycle and does not immediately re-ignite itself, the voltage between the arc terminals rises towards its open-circuit value, which is approximately 3 to 4 times the arc voltage. This strong voltage surge is multiplied by the step-up transformer $T_2$ and has the effect of very rapidly charging $C_1$ through $C_2$. The voltage of $C_1$ becomes higher than the sparkover voltage of S, added to the voltage at the arc terminals, owing to which $C_1$ discharges itself into the welding circuit, thereby re-ionizing the arc gap and assisting the arc re-ignition.

Figure 5:
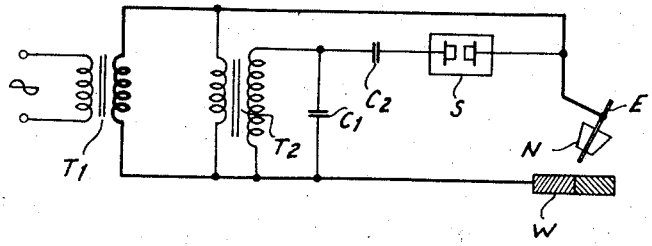

Figure 5 shows a modified form of the device of Figure 4, in which the secondary winding of $T_2$ is connected directly to the plates of $C_1$, while $C_2$ is connected between $C_1$ and the spark gap S. This is the preferred form of the invention, and excellent results have been obtained with $C_1=0.1$ f. and $C_2=0.25$ f., the step-up ratio of $T_2$ being approximately 60/800 and the sparkover voltage of S from approximately 250 to 350 volts R.M.S. at 50 cycles A.C. This circuit may also be provided with a suppressor for radio interference, comprising for instance a resistor of 25 ohms (not shown) between the welding electrode and the spark gap and a capacitor of 10,000 picofarads (also not shown) between this welding electrode and the work W.

In the devices of Figures 1 to 5, the spark gap may be formed of a gaseous discharge tube, similar for instance to some existing types of lightning arrestors, filled with either a monoatomic gas, or with hydrogen, or with a mixture of these gases, at a pressure comprised for instance between 200 and 600 millimeters mercury, having a sparkover voltage in the range previously indicated, and a short de-ionizing time, substantially less than 0.01 second.

However, the preferred form of spark gap is a spark gap with aluminum electrodes protected by placing their active ends in the path of a stream of inert gas, argon or helium, an advantageous embodiment being one in which the arc-shielding gas is fed through the spark gap device to the welding gun. In this case, the suitable distance between the aluminum electrodes may be comprised between about 0.05 and 0.20 millimeter.

In the devices of Figures 4 and 5, the step-up transformer $T_2$ might, obviously, be replaced by an auto-transformer having similar ratings. Both these devices are safe for the operator, since, on the one hand, the short-circuit current through the spark gap is limited by the impedance of $C_1$ and $C_2$, which is very high for the normal mains frequency. On the other hand, if the welding gun is accidentally disconnected from the welding transformer, the stabilizator circuit is no longer supplied with current.

The above devices give excellent stabilization, and when welding aluminum, have a good pickling effect on the weld metal, while the arc may be stretched up to 10 or 15 mm. without extinguishing. When a longer arc is required, it will be possible to adjust the circuits for a slightly higher surge voltage. It is also possible, without having to alter the characteristics of the circuits, to connect the spark gap either between the main capacitor and the welding torch or between this capacitor and the work. In some cases, as in Figure 2 and 4, the respective places of S and C may also be inverted, without modifying the fundamental characteristics of the circuit.

Figure 6:
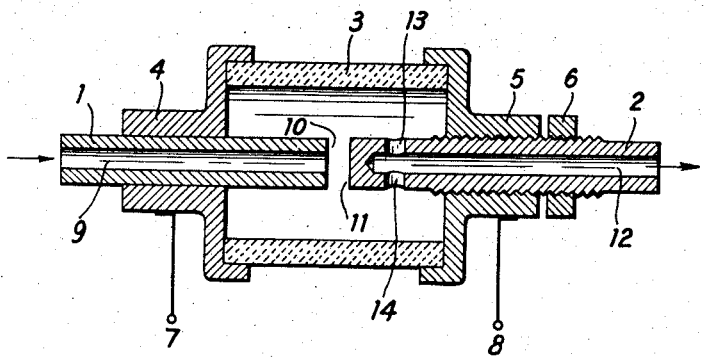
Figure 6 shows one embodiment of a spark gap unit according to the invention.

Figure 6 represents a spark gap unit comprising two electrodes 1 and 2, preferably made of aluminum, the adjacent ends of which are surrounded by a tubular envelope 3, for instance a tube of glass, Plexiglas or other suitable insulating material. Both ends of tube 3 are closed by caps 4 and 5, giving passage to the electrodes. One of the electrodes, for instance the electrode 2, is adjustably supported in the corresponding cap, for instance it is threaded, a locking nut 6 being provided for retaining it when adjusted at the proper distance from electrode 1. Each electrode is provided with a terminal, respectively 7 and 8, for electrical connection to the other elements of the circuit. One of the electrodes is provided with an axial bore 9, into which the protective gas may be injected, while the other electrode has a longtiudinal blind hole 12 communicating with radial openings 13, 14 located slightly behind the active end 11 of the electrode. Owing to this conformation of the electrodes, the stream of gas, fed into either of the hollow electrodes, will be homogeneously circulated between the active ends 10 and 11 of both electrodes.

Figure 7:
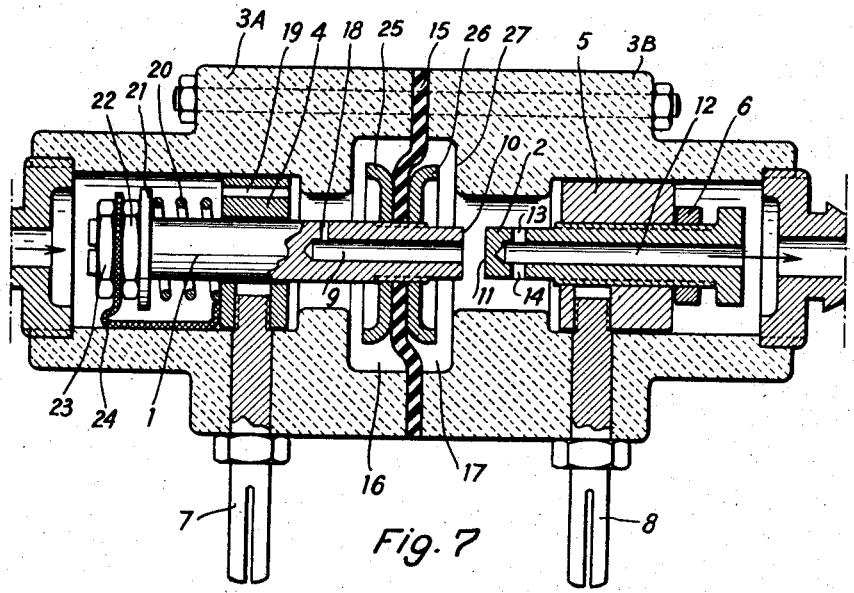
Figure 7 shows another type of spark gap unit provided with a flexible diaphragm.

Figure 7 shows in longitudinal cross-section a spark gap unit provided with a flow-responsive protective device. It comprises two electrodes 1 and 2, shaped similarly to those of Figure 6, surrounded by a shell formed of two tubular bodies 3A and 3B made of insulating material, such as for instance Plexiglas, joined end to end. The numerals 4 to 14 in Figure 7 denote the same elements as in Figure 6. Between the two half-shells 3A and 3B is clamped a flexible diaphragm 15 traversed in its center by the electrode 1. This diaphragm divides the shell into two chambers 16 and 17, a calibrated gas passage being provided between these two chambers by an orifice 18 in the tubular wall of electrode 1, said orifice communicating with the blind axial bore 9 of said electrode, which opens at the active end 10 thereof. The electrode 1 is slidably supported in a tubular member 4, having a gas passage 19. A coil spring 20 is compressed between said member 4 and a washer 21 held by a nut 22 on the outer end of electrode 1. The tubular member 4 is conveniently held in place by the plug-in terminal 7, which is preferably connected to the mobile electrode 1 by a very flexible braid of metallic wires 24 held between the nut 22 and a second nut 23. The mobile electrode 1 is secured to the flexible diaphragm by means of two washers 25, 26 which may, for instance, be screwed onto this electrode. For limiting the motion of electrode 1 towards electrode 2, there is provided a stop 27 formed, for instance, by a thicker portion of the half-shell 3B, and against which the washer 26 may abut. Finally, the outer ends of the half-shells 3A and 3B are provided with nipples, visible in part only in the drawing, for connecting the unit to the gas-supplying apparatus on one side and to the welding gun on the other side, by means of flexible tubing (not shown).

The operation of this device is as follows: supposing gas is fed through the device in the direction showed by the two arrows, this gas will pass through the passage 19 into the first chamber 16, the only issue of which is the calibrated orifice 18 into the duct 9 inside electrode 1. The pressure drop caused by this calibrated orifice 18 will cause the diaphragm 15 to be deflected towards electrode 2, thereby bringing electrode 1 within proper sparkover distance from electrode 2. If however the flow of gas becomes insufficient the spring 20 will retract electrode 1 beyond disruptive distance from electrode 2. This prevents the electrodes becoming damaged by sparking while they are not protected by a sufficient gas stream. It also increases the safety and convenience of operation of the welding set, since it makes it possible for the operator to adjust the welding torch, or to proceed to a similar operation, without having to switch off the stabilizing unit, but merely by turning off the inert gas supply. It also has the advantage to render the use of aluminum sparking electrodes quite practical, although aluminum is far less resistant, thermally and mechanically, than the metals, such as tungsten, usually chosen for the manufacture of spark gap electrodes.

Figure 8:
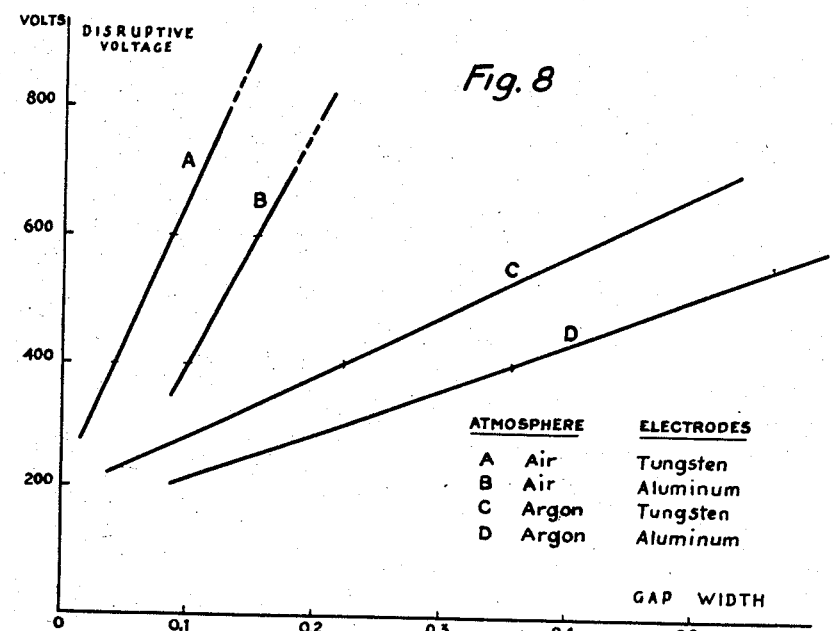
Figure 8 is a chart showing the influence of the nature of the gas and of the metal forming the spark gap electrodes.

Figure 8 is illustrative of the advantageous features of a spark gap having aluminum electrodes in a monoatomic gas atmosphere. It will be seen, for instance, that, for a same sparkover voltage of 400 volts, the combination D, comprising aluminum electrodes in argon, allows for a spark gap width of about 0.35 mm., whereas this width is respectively:

0.22 mm. approx. for combination C (tungsten in argon)
0.08 mm. approx. for combination B (aluminum in air)
0.04 mm. approx. for combination A (tungsten in air)

It will be obvious that a gap of 0.35 mm. is much more easily adjusted than a 0.04 mm. one, and that the manufacturing and maintenance of the spark gap device are thereby greatly simplified.

What we claim is:

1. An inert gas shielded arc welding system comprising a spark gap associated with a capacitor and a voltage source for applying recurrent voltage surges in the arc circuit, an air tight shell about said spark gap, and means for passing a portion at least of the arc shielding gas flow through said shell towards the welding arc.

2. An inert gas shielded arc welding system according to claim 1, comprising flow responsive means adapted for interrupting the operation of the spark gap whenever the flow of inert gas in said system is less than a predetermined value.

3. An inert gas shielded arc welding system according to claim 2, in which the flow responsive means are responsive to the variations of gas flow through the spark gap shell.

4. An inert gas shielded arc welding system according to claim 3, in which the flow responsive means are substantially contained in the spark gap shell.

5. An alternating current arc welding system comprising, a welding transformer, a supply of inert gas, an inert-gas shielded welding torch with a non-consumable electrode, and arc stabilizer means comprising, a first capacitor, a voltage step-up transformer having its primary winding connected across the welding terminals of said welding transformer, one side of the secondary winding of said step-up transformer and one plate of said first capacitor being connected to one welding terminal, the other side of said secondary being connected to the other plate of said first capacitor through a second capacitor, said other plate of said first capacitor being connected to the other welding terminal through a spark gap, said spark gap being provided with an air-tight shell and with gas conduits extending respectively to said inert gas supply and to said torch.

6. An alternating current arc welding system according to claim 5, in which the value of said first capacitor is approximately 0.25 microfarad and the value of said second capacitor is approximately 1 microfarad.

7. A stabiliser for an inert gas shielded alternating current welding arc comprising, a voltage step-up transformer having its primary winding connected across the welding terminals, a first capacitor across the secondary winding of said transformer, one side of said secondary being connected directly to one of the welding terminals, the other side of said secondary being connected to the other welding terminal through a second capacitor in series with a spark gap, said spark gap being confined in an enclosure provided with nipples adapted for being inserted in a gas supply line for supplying inert gas to said welding arc through said gap enclosure.

8. A welding arc stabiliser according to claim 7, in which the value of said first capacitor is approximately 0.1 microfarad and that of said second capacitor is approximately 0.25 microfarad.

References Cited in the file of this patent

UNITED STATES PATENTS

| | | |
|---|---|---|
| 655,176 | Ackerman | Aug. 7, 1900 |
| 2,399,331 | Denault | Apr. 30, 1946 |
| 2,440,154 | Oles | Apr. 20, 1948 |
| 2,470,668 | White | May 17, 1949 |
| 2,478,119 | Mitchel | Aug. 2, 1949 |
| 2,674,708 | Williamson | Apr. 6, 1954 |